United States Patent
Verma et al.

(10) Patent No.: US 10,693,648 B2
(45) Date of Patent: Jun. 23, 2020

(54) SYSTEM AND METHOD FOR DYNAMIC GRID AUTHENTICATION

(71) Applicant: CA, Inc., New York, NY (US)

(72) Inventors: Deepak Kumar Verma, Telangana (IN); Akkera Nagesh, Kukatpally (IN); Sukhmeet Singh Gulati, Nallagandla (IN)

(73) Assignee: CA, Inc., New York, NY (US)

( * ) Notice: Subject to any disclaimer, the term of this patent is extended or adjusted under 35 U.S.C. 154(b) by 255 days.

(21) Appl. No.: 15/935,494

(22) Filed: Mar. 26, 2018

(65) Prior Publication Data

US 2019/0296913 A1 Sep. 26, 2019

(51) Int. Cl.
*H04L 9/32* (2006.01)
*H04L 9/08* (2006.01)
*G06F 21/36* (2013.01)
*H04W 12/06* (2009.01)

(52) U.S. Cl.
CPC ............ *H04L 9/3228* (2013.01); *G06F 21/36* (2013.01); *H04L 9/0866* (2013.01); *H04L 9/3271* (2013.01); *H04W 12/06* (2013.01)

(58) Field of Classification Search
CPC ... H04L 9/3228; H04L 9/3271; H04L 9/0866; H04L 2209/56; H04L 63/0838; G06F 21/36; H04W 12/06
See application file for complete search history.

(56) References Cited

U.S. PATENT DOCUMENTS

| | | | | |
|---|---|---|---|---|
| 6,170,058 | B1 * | 1/2001 | Kausik | G06F 21/6245 713/193 |
| 8,843,757 | B2 * | 9/2014 | Varadarajan | G06F 21/34 713/168 |
| 8,947,197 | B2 * | 2/2015 | Craymer | H04L 9/3226 340/5.2 |
| 9,111,073 | B1 * | 8/2015 | Jiang | G06F 21/36 |
| 2008/0005035 | A1 * | 1/2008 | Schwartz | G06F 21/31 705/325 |
| 2008/0072045 | A1 * | 3/2008 | Mizrah | G06F 21/36 713/171 |
| 2008/0098464 | A1 * | 4/2008 | Mizrah | G06F 21/36 726/5 |
| 2009/0284344 | A1 * | 11/2009 | Craymer | G06Q 20/341 340/5.54 |
| 2011/0113245 | A1 * | 5/2011 | Varadarajan | G06F 21/34 713/168 |
| 2011/0197070 | A1 * | 8/2011 | Mizrah | H04L 63/0869 713/176 |

(Continued)

*Primary Examiner* — J. Brant Murphy
(74) *Attorney, Agent, or Firm* — Morgan, Lewis & Bockius LLP

(57) ABSTRACT

A method includes dynamically generating an authentication grid that identifies an association between a first set of characters and a second set of characters. Based on a shared secret associated with a user, an encrypted version of the authentication grid is generated and transmitted to a first computing device associated with the user. A challenge is generated and transmitted to a second computing device associated with the user. User input is received, and the user is authenticated based at least in part on the authentication grid and a mapping of at least one character in a first set of characters in the challenge to at least one second character the user input.

21 Claims, 10 Drawing Sheets

(56) References Cited

U.S. PATENT DOCUMENTS

| | | | |
|---|---|---|---|
| 2011/0213985 A1* | 9/2011 | Miller | G06F 21/35 |
| | | | 713/185 |
| 2011/0295740 A1* | 12/2011 | Blackwell | G06Q 20/10 |
| | | | 705/39 |
| 2013/0124855 A1* | 5/2013 | Varadarajan | G06Q 20/3276 |
| | | | 713/155 |
| 2016/0292685 A1* | 10/2016 | Kairi | G06Q 20/4012 |
| 2019/0034612 A1* | 1/2019 | Smales | H04L 9/3231 |
| 2019/0057199 A1* | 2/2019 | Hutchinson | G06F 21/42 |

* cited by examiner

SYSTEM AND METHOD FOR DYNAMIC GRID AUTHENTICATION

BACKGROUND

The present disclosure relates to security and, in particular, to a method, apparatus, and executable instructions for the dynamic generation of more secure grid-based, one-time passwords.

SUMMARY

The present disclosure relates to interfaces and, in particular, to a method, apparatus, for the dynamic generation of more secure grid-based, one-time passwords (OTPs).

A method includes dynamically generating an authentication grid that identifies an association between a first set of characters and a second set of characters. Based on a shared secret associated with a user, an encrypted version of the authentication grid is generated and transmitted to a first computing device associated with the user. A challenge is generated to include at least one character in the first set of characters identified in the authentication grid. The challenge is transmitted to a second computing device associated with the user. User input is received that includes at least one second character in the second set of characters. The user is authenticated based at least in part on the authentication grid and a mapping of the at least one character in the first set of characters in the challenge to the at least one second character as received in the user input based on the machine-readable authentication code.

According to another embodiment of the present disclosure, a non-transitory, computer-readable storage medium has instructions stored thereon. The instructions are executable by a computing system to cause the computing system to dynamically generate an authentication grid that identifies an association between a first set of characters and a second set of characters. Based on a shared secret associated with a user, an encrypted version of the authentication grid is generated and transmitted to a first computing device associated with the user. A challenge is generated to include at least one character in the first set of characters identified in the authentication grid. The challenge is transmitted to a second computing device associated with the user. User input is received that includes at least one second character in the second set of characters. The user is authenticated based at least in part on the authentication grid and a mapping of the at least one character in the first set of characters in the challenge to the at least one second character as received in the user input based on the machine-readable authentication code.

According to another embodiment of the present disclosure, a non-transitory, computer-readable storage medium has instructions stored thereon. The instructions are executable by a computing system to cause the computing system to receive an encrypted authentication grid. A shared secret is used to decrypt the encrypted authentication grid to generate a user-readable authentication grid for display to the user. The authentication grid identifies an association between a first set of characters and a second set of characters. A challenge that includes a first plurality of characters selected from the first set of characters is received and displayed. User input is received that includes a second plurality of characters based on the challenge and the user-readable authentication grid. The user input is transmitted to the authentication server for authentication of the user.

Certain embodiments of the present disclosure may provide one or more technical advantages. For example, the dynamic grid-based authentication system may remove security constraints faced while using a static grid-based authentication system. Further, security may be improved since the solution involves generating a random grid, which contains a challenge that must be signed by the user before the grid can be decrypted by the user. As a result, the dynamically generated grid may be decrypted and decoded only by the intended user, reducing concerns over the authentication grid or the debit card being stolen.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-9, like numerals being used for corresponding parts in the various drawings.

DETAILED DESCRIPTION

Figure 1A:
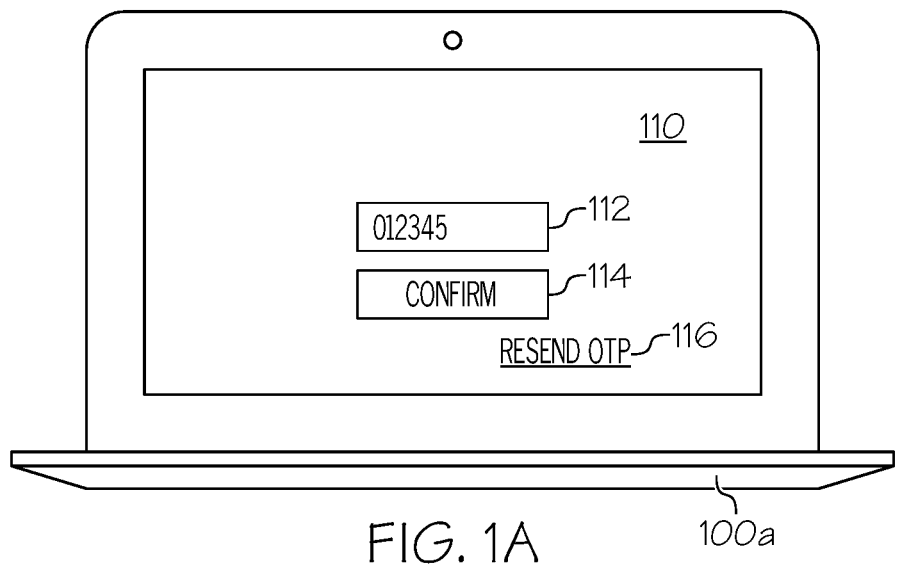
FIGS. 1A-1B illustrate elements of one-time password (OTP) based authentication, according to a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor and/or processing circuitry of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Typically, end-user security of automatic teller machine (ATM) and debit cards primarily depends on the user holding and keeping the card safe and keeping the user's personal identification number (PIN) secret. Debit cards are usable in environments other than at an ATM, such as for online purchasing.

As referred to herein, an "account PIN," which may also be referred to as a "static PIN," refers to the PIN provided to the account holder by the account provider for use by the account holder to authorize transactions on the user's account through a transaction interface such as an ATM terminal or POS interface. Typically, the user account PIN is a static, or fixed datum, for example, a string of four alpha-numeric characters, which may remain unchanged for the life of the account, or which may be infrequently changed only when necessary. For example, the account PIN may be changed when an account card, such as an ATM or debit card associated with the user account is lost, stolen or reissued. The account PIN may be defined or assigned by the account provider, or the account provider may allow the account holder to select the account PIN, for example, by selecting four alphanumeric characters of the account holder's preference.

Users are subject to attacks from many venues. For example, "phishing" attacks are attacks on the account PIN itself. The static nature of the magstripe data on the ATM card and the use of a static account PIN aggravates the problem. During the life of the ATM or debit card, which may be typically up to three years, the magstripe data and PIN do not change, e.g., the magstripe data is static, and the PIN is static. The same static PIN is used to authorize each and every transaction conducted with the ATM card on the user's account. If an attacker obtains the card and PIN, he can easily compromise the account, which may go undetected until the user reviews an account statement, or an event such as an overdraft notifies the user that the account has been compromised.

The security of PIN authorized transactions, such as ATM transactions, is vulnerable to a number of attack methods, which may include the debit or ATM magstripe being read by a skimmer or similar device attached to an ATM terminal, point-of-sale (POS) terminal or other form of magnetic card reader. The card can be "cloned" using the magstripe information obtained from the skimmer. The user's static PIN can be obtained by visual observation of the PIN being entered into an ATM or POS terminal, which may be called "shoulder-surfing." The obtainment of the user's static PIN may also be facilitated by the use of surveillance camera or other recording device. The user's static PIN can be obtained by other means, for example, during an online transaction where the PIN, which is not protected cryptographically prior to input into the online interface, and other account data may be recorded and obtained using a "Trojan" type virus or other malicious virus to record and retrieve the account information and PIN for use in subsequent attacks on the user's account.

In certain circumstances, such as when a mobile application is used to conduct financial transactions and other types of high risk transactions, additional security may be required. Accordingly, systems and methods have been devised to replace the static PIN for a user account with a dynamic PIN structure, wherein a unique, single use PIN, also referred to as a one-time PIN (OTP) or one-time passcode (OTP), is provided by a user accountholder's mobile device. The OTP is a password that is valid for only one login session or transaction, on a computer system or other digital device.

In a non-limiting example, the generated OTP is provided as a verifiable or authentic PIN which may be substituted for the account PIN in a PIN-required financial transaction, e.g., an ATM transaction or point of sale (POS) debit transaction using a user or account holder card which may be an ATM or debit card. The POS transaction may be a debit transaction in a "brick and mortar" or a payment or purchase made through an online POS system. The system and method described herein to generate an OTP from a user device can be adapted to any system where a PIN input is required for access, approval, authorization or authentication, e.g., for secure access to an online system, computer network, database, etc., or online authentication of personal identity or approval of a transaction, or for any other representation of an account number or user identification which is used in conjunction with a PIN for a transaction, authorization or authentication. For example, the card may be a medical insurance card with a magnetic stripe and the PIN may be required for the release of medical information, authorization of a prescription or authentication of the patient subscriber to the insurance provider. As another example, the card may be a credit card which requires PIN authorization for some or all transactions. As still another example, the card may be a secure access card used with a card reader and PIN pad for authorization to a secured area, which may be a physical area, such as a building, or to secure network or database.

By definition the OTP can only be used one-time, for a single PIN-required transaction. For the next card use, e.g., for the next PIN-required transaction, another different OTP must be generated by the OTP generator on the user device and provided to the user cardholder. This effectively prevents many attacks on PIN-required transactions. For example, when an attacker has attached a "skimmer" to an ATM, the skimmer can capture the magstripe data as the card is swiped to initiate a transaction and can record the OTP entered to authorize the transaction. The user may complete the transaction unaware that the user's card magstripe data and the inputted OTP have been obtained by the attacker. However, since the OTP has been used for the transaction just completed, the same OTP cannot be used again, so a subsequent attack using the skimmed magstripe and the already used OTP is foiled. Even if the attacker were to prevent the user's first (legitimate) transaction and use the OTP himself, the attacker is limited to at most one fraudulent transaction using the OTP, thereby substantially limiting the threat to the user's account.

Figure 1B:
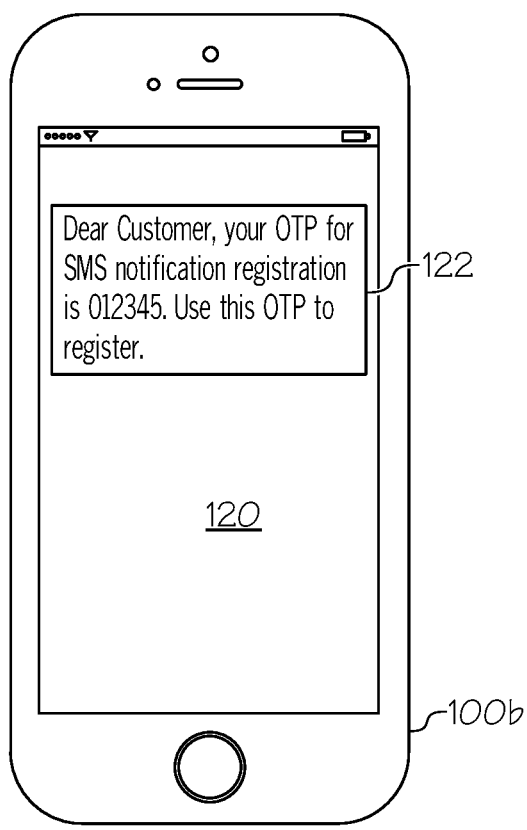

FIGS. 1A-1B illustrate elements of one-time password (OTP) based authentication. Specifically, in a depicted example scenario, the user conducts an on online transaction using a first graphic user interface (GUI) screen 110 on first computing device 100*a* and receives the OTP via a second GUI 120 on a second computing device 100*b*. First computing device 100*a* is depicted as a laptop computer in FIG. 1A and second computing device 100*b* is depicted as a mobile device in FIG. 1B; however, it is generally recognized that the transaction can be conducted and/or the OTP can be received on any type of computing device. Likewise, in particular embodiments, the transaction can be conducted and the OTP may be received on the same computing device 100*a*. As still other modifications, it is recognized that the user account may be an ATM or debit account associated with a user ATM/debit card and the account transaction may be conducted on an ATM transaction, or a debit card transaction which may be a point-of-sale (POS) transaction, or any other transaction requiring the user to provide a user PIN to authorize the transaction.

For example, in a typical POS transaction, a GUI 110 such as shown in FIG. 1A may be displayed to the user near the conclusion of the transaction. Initially, user input box 112 of GUI 110 is empty and/or may include an indicator that identifies that a OTP should be entered into user input box 112 by the user. Soon after or simultaneously with the display of GUI 110 on first computing device 100*a*, a second GUI 120, as shown in FIG. 1B, is displayed to the user on second computing device 100*b*. Second GUI 120 includes a message 122 that includes the OTP to be used for finalizing the transaction being conducted on first computing device 100*a*. For example, in the depicted embodiment, the message 122 comprising the OTP is received as a SMS message. However, message 122 may be alternatively be received as an email message or any other suitable message that may be received on either of computing devices 100*a* and 100*b* or another computing device associated with the user.

After receiving message 122 including the OTP, the user enters the OTP into user input box 112 of GUI 110. In the depicted example, the user has entered the OTP of '012345' into user input box 112. After entry of the OTP, the user selects the confirm button 114 to cause the transaction to be submitted to the financial institution for authentication and finalization. For example, in the case of an ATM transaction, the entered OTP may be transmitted over the ATM network to the user's bank or provider system. The provider system, e.g., the bank issuing the user's ATM card used for the transaction, is configured to verify the OTP generated by the user device as an authentic PIN associated with the user's ATM card, to authorize an ATM transaction. The provider system may be configured to generate an authenticating OTP, for comparison with the generated OTP inputted into the ATM, to verify the generated OTP as an authentic PIN for the user's ATM card, and thereby determine an authorization result for the ATM transaction.

As depicted, GUI 110 as includes a resend OTP button 116. If, the OTP does not work (such as where too much time passes between the receipt of the OTP on GUI 120 and the entry of the OTP on GUI 110 or the user mistypes the OTP), the user can press the resend OTP button 116 to cause a new OTP to be generated and transmitted to the user on computing device 100a and/or 100b.

According to certain other embodiments, the OTP may not be transmitted to the computing device associated with the user. Instead, computing devices 100a and/or 100b may be provided with an OTP application that includes at least one user account-specific OTP key configured to dynamically generate an OTP that is useable as a PIN for a user account.

As stated above, the OTP application may be configured with one or more OTP generators. Each of the OTP generators may be defined by a specific user account. For example, a first OTP generator may be configured for the user's ATM card for a first bank account, and a second OTP generator may be configured for the user's debit card for a second bank account. The system and method described herein may also be provided and securely hosted in JavaScript™ within a browser used by a desktop computer, laptop, netbook, or other Internet accessible computing device, to provide OTPs, for example, for online transactions. The OTP generating software client can be further configured to be secured for use exclusively with that unique user device, by incorporating a machine identification parameter derived as a machine effective speed calibration (MESC) in the OTP application and authentication process.

The OTP generator may use an industry-standard algorithm for OTP generation, including a HMAC-Based One-Time Password algorithm, also referred to as HOTP (from the Open Authentication initiative), and a Europay, MasterCard and Visa Chip Authentication Program algorithm, also referred to as EMV/CAP, a payment industry OTP standard first developed by MasterCard, or may use a customized algorithm. The OTP generator is defined by a key or secret associated with the user's account, e.g., with the user's ATM or debit card, where the key or secret may be encrypted or obfuscated using a method of cryptographic camouflaging as described herein to provide an OTP generation key, also referred to as an OTP key. The key or secret may be camouflaged using a PIN such as the user account PIN, a machine identifier such as a machine effective speed calibration (MESC) as described herein, which is defined by and unique to the user's device, another data element, or a combination of two or more of a PIN, a MESC and a data element.

To use the OTP generator associated with an OTP application, the user selects the OTP generator associated with the user ATM card with which the user is planning to conduct a transaction, from the OTP application on computing device 100b. The user may obtain an OTP from the user device by opening or selecting the OTP application on the computing device 100b, and if required, selecting a "generate OTP" button or similar command, with no requirement for the user to input a PIN, e.g., the OTP is generated and provided without any further user input. Alternatively, the user may be required to enter the user's account PIN for the ATM card to be used for the transaction, or another data element, for example, an MESC or a transaction amount, which may be used to authenticate the user to the OTP application, to generate the OTP, or to authenticate the user or user transaction to an authenticating server. In other embodiments, the OTP application may be linked to the financial account of the user such that when a transaction is initiated using the user's ATM or debit card, the OTP application may receive a message from the financial institution and automatically generate an OTP in response to the message. In such an embodiment, message 122 may be a pop-up message generated by the OTP application.

The OTP generator uses the camouflaged key to generate an OTP, which is provided to the user on GUI 120, for use as a PIN input for a single user transaction, for example, for entry into the ATM to authorize the planned ATM transaction or to finalize an online transaction. If the user chooses to conduct a subsequent transaction with the same ATM or debit card where a subsequent PIN input is required, the user repeats the process, selecting the OTP generator on the user's device to generate another OTP which is inputted to a banking system to authorize the subsequent transaction.

Where the OTP replaces an account PIN to authorize a user transaction, the OTP may be configured or provided in the same form as the account PIN for which the OTP is substituted. For example, if the user account PIN is a string of four alpha-numeric characters, the OTP may also be configured as a string of four alpha-numeric characters. In the depicted embodiment, message 122 identifies the OTP for the transaction as being '012345,' which is a string of six numeric characters. In this way the dynamically generated OTP can be used in any context where the static PIN could have been used; for direct input into an ATM; input into a website for an online purchase; written on a mail order form or provided verbally in a telephone transaction, by way of non-limiting example.

An advantage that is addressed by OTPs is that, in contrast to static passwords, they are not vulnerable to replay attacks. This means that a potential intruder who manages to record an OTP that was already used to log into a service or to conduct a transaction will not be able to abuse it, since the OTP will no longer be valid. A second major advantage is that a user who uses the same (or similar) password for multiple systems, is not made vulnerable on all of them, if the password for one of these is gained by an attacker. OTPs have been discussed as a possible replacement for, as well as enhancer to, traditional passwords.

However, OTP-based authentication is not without its flaws. OTPs are difficult for human beings to memorize. Additionally, there is no additional security to ensure that only an authorized person is able to use the OTP. Since an OTP comes to a device, anyone who has the device may be able to use the OTP. Accordingly, a device that is lost or stolen may be subject to increased risk of fraud. Conversely, rightful owner of the device has lost the mechanism for receiving the OTP and, thus, may not be able to be authenticated.

Figure 2A:
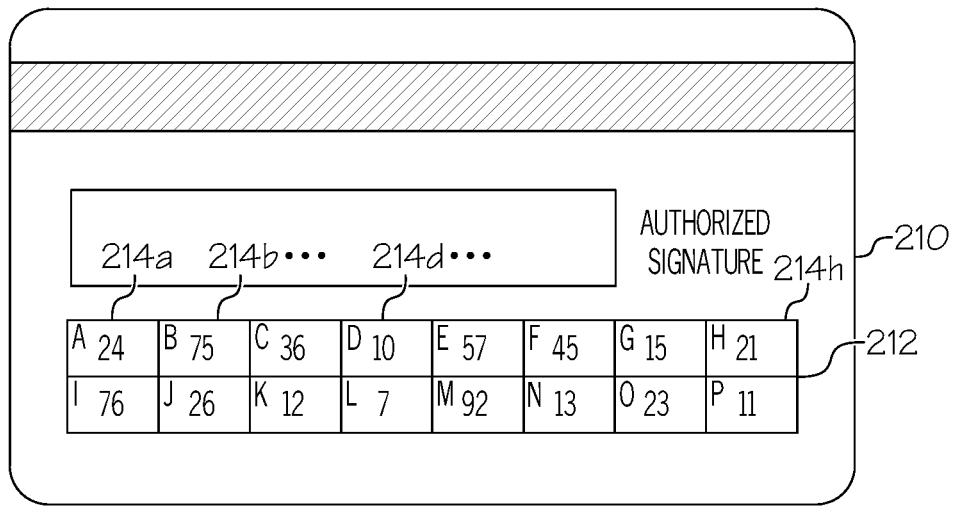
FIGS. 2A-2B illustrate elements of grid-based OTP authentication for authentication, according to a non-limiting embodiment of the present disclosure.
Figure 2B:
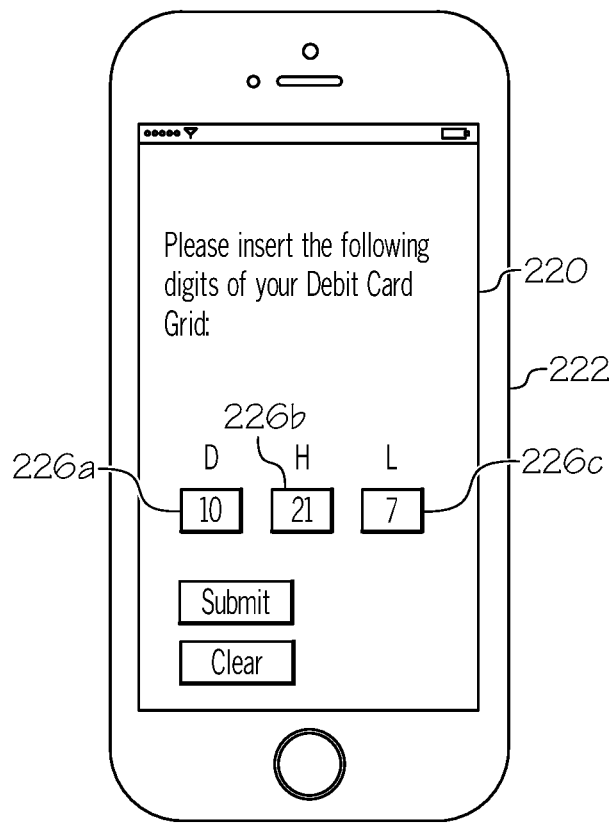

Grid-based OTP authentication is a specific type of OTP authentication for securing user logins by requiring the user to enter values from specific cells in a grid whose content should be only accessible to the user and the service provider. FIGS. 2A-2B illustrate elements of grid-based OTP authentication, according to a non-limiting embodiment of the present disclosure. Specifically, FIG. 2A illustrates a debit card 210 that includes an authentication grid 212 printed directly on it, and FIG. 2B illustrates a GUI 220 that presents a challenge for an OTP on a computing device 222. However, while a debit card 210 is illustrated, authentication grid 212 may be printed on any other card, paper, or suitable medium.

According to certain embodiments, authentication grid 212 includes a number of cells 214a-p. Each cell 214a-p is associated with a randomly selected letter and a randomly selected number. In the particular illustrated example, there are sixteen cells 214a-p in authentication grid 212. The sixteen grid cells 214a-p are each associated with a selected one of the first sixteen letters of the alphabet (i.e., A, B, C, . . . P). Though the assignment is shown to be sequential from A to P, the assignment of letters to each cell 214a-p may be randomized in other embodiments.

In addition to the associated letter, each cell 214a-p is assigned or otherwise associated with a randomly selected number. For example, cell 214d, which is associated with the letter D, is also associated with the number 10. As additional examples, cell 214h, which is associated with the letter H, is also associated with the number 21, and cell 214l, which is associated with the letter L, is also associated with the number 7. In the illustrated example, the randomly assigned numbers range between 0 and 99. However, the numbers may fall within any suitable range. Additionally, though authentication grid 212 is not depicted as including any repeated numbers, it is recognized that authentication grid 212 may include repeated numbers in other embodiments. Because the grid consists of letters and numbers in rows and columns, the method is sometimes referred to as bingo card authentication.

In one example scenario, authentication grid 212 of FIG. 2A may be used when a user logs into the user's bank account using a mobile or web-based application or when a user conducts an online transaction using computing device 222 of FIG. 2B. For example, in a particular scenario, when the user of computing device 222 attempts to log into the user's bank account with his user name and password, the challenge presented in GUI 220 may be displayed to the user to prompt the user to input the characters from a number of randomly-selected cells in the authentication grid. As depicted, the challenge includes three user input boxes 226a-c for entry of a three-digit OTP. Initially, user input boxes 226a-c may be empty. However, each user input box 226a-c may include an indicator that identifies a letter selected from the letters associated with cells 214a-p. For example, first user input box 226a includes an indicator identifying the letter "D." Likewise, second user input box 226b and third user input box 226c include indicators identifying the letters "H" and "L," respectively. To enter the OTP, the user must use authentication grid 212 on debit card 210 to determine the numerals that are associated with each of the letter. Thus, for the first user input box 226a identified by the "D" indicator, the user would use authentication grid 212 to determine that the numeral associated with the letter "D" is 10. Likewise, the user would use authentication grid 212 to determine that the numeral associated with the letter "H" is 21 and the numeral associated with the letter "L" is 7. Thereafter, the user enters the numbers 10, 21, and 7 into the first, second, and third user input boxes 212a-c, respectively. If the user enters the correct character sequence, access is granted to the account. Or, in the case of an online purchase, the user may be authenticated for purposes of making the financial transaction.

Similar to the OTP authentication described above with regard to FIGS. 1A and 1B, grid-based authentication is a type of two-factor authentication because it requires that the user provide proof of something that they know (i.e., the user name and password associated with the account) as well as proof of something that they have (i.e., the possession of the debit card having the grid printed thereon). While grid authentication protects against replay attacks because the same characters selected for one login cannot be reused, the grid may be hard for some users to memorize. Accordingly, the authorized user may be required to carry the grid with them at all times so that transactions can be completed as necessary. This may be the case even during online purchases where the card has no rule to play in the transaction. As another drawback, there is no mechanism in place to prevent an unauthorized person with exceptional memory skills from memorizing or copying the entire grid. Thus, grid authentication is also vulnerable to an attack method like brute force cracking, in particular if the same grid is used for an extended period of time or if the debit card is lost or stolen. Accordingly, there is a need in the marketplace for more secure OTP-based authentication. Embodiments of the present disclosure may address the above problems, and other problems, individually and collectively.

According to certain embodiments, for example, systems and method may be provided for the dynamic generation of an authentication grid for use in grid-based authentication. In contrast to the grid-authentication mechanism described above, which includes a static grid being printed on a debit card, the dynamically generated authentication grid is generated and transmitted to a user's computing device in real-time for a single use in a particular transaction. According to certain embodiments that are described in more detail below, the authentication solution includes two main components: an authentication server is responsible for performing processes for user enrollment and, after enrollment, user authentication and a computing device such as a mobile device or laptop that includes a smart application for decrypting the dynamically generated authentication grid.

More specifically, according to certain embodiments, a secret may be shared between the authentication server and the user's computing device during the enrollment process. The user's computing device stores the secret using a device locking technology. Later, during authentication of the user, the authentication server generates a dynamic authentication grid, which is cryptographically camouflaged using the shared secret so that it can only be read by the intended user's computing device. The encrypted code is then converted to a machine-readable code, such as a Quick Response (QR) Code®, in a particular embodiment. According to certain embodiments, the smart application on the user's computing device includes logic for scanning or reading the QR Code®. The smart application also includes logic for using the shared secret to decrypt the cryptographically camouflaged authentication grid so that the dynamically-generated authentication grid can be displayed to the user.

Certain embodiments of the present disclosure may provide one or more technical advantages. For example, the dynamic grid-based authentication system may remove security constraints faced while using a static grid-based authentication system. Further, security may be improved since the solution involves generating a random grid, which contains a challenge that must be signed by the user before the grid can be decrypted by the user. As a result, the dynamically generated grid may be decrypted and decoded only by the intended user, reducing concerns over the authentication grid or the debit card being stolen.

Another technical advantage may be that the dynamic grid is transmitted directly to the user's computing device. As a result, there is no need for the user to carry around a card that includes the authentication grid. Additionally, because the grid is generated for each individual transaction, certain embodiments protect against shoulder surfing and the unlawful use of cameras for obtaining a copy of the authentication grid for subsequent use. Additionally, because the dynamically generated grid is only valid for a limited time, a new dynamically generated grid must be generated for each transaction. As another example technical advantage, since the numbers and their positions are randomized on each access, more robust grid-based authentication is provided.

Figure 3:
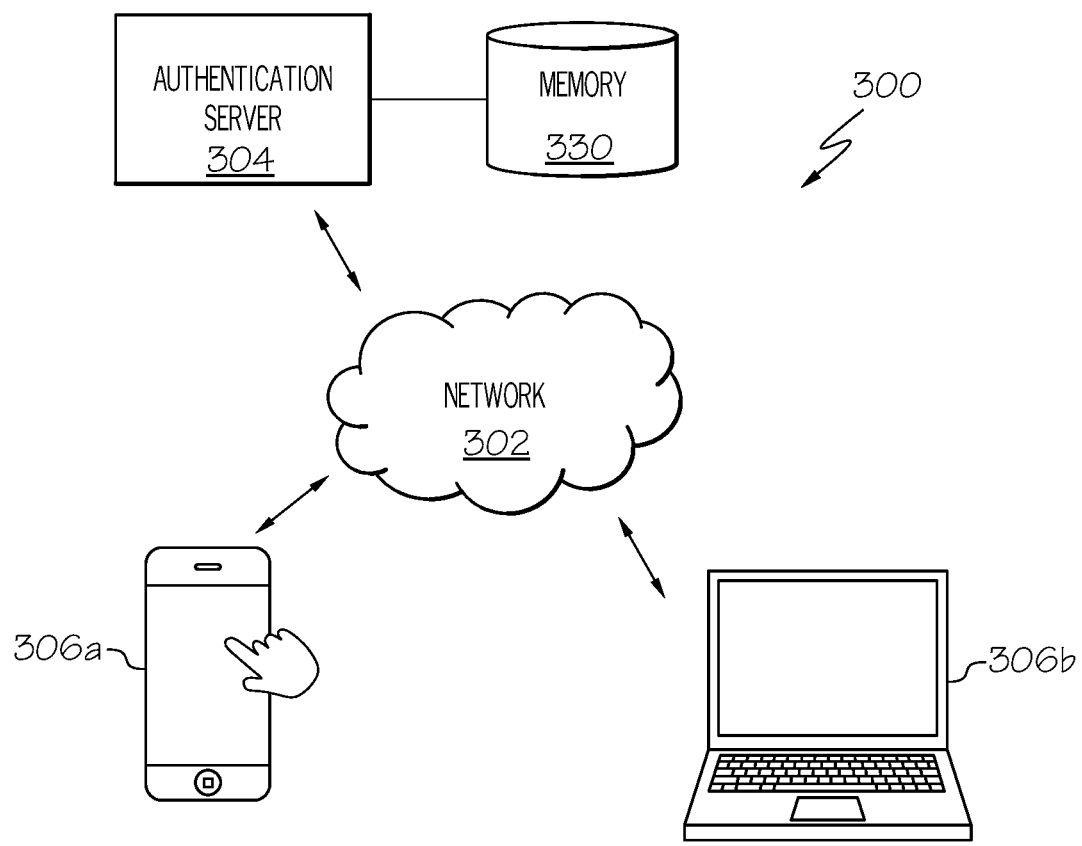
FIG. 3 illustrates an environment for authenticating a user based on a dynamically-generated authentication grid, according to a non-limiting embodiment of the present disclosure.

FIG. 3 illustrates an exemplary authentication system 300 in which the subject matter of the disclosure can function. The system 300 generally includes a public network 302 communicatively coupling an authentication server 304 to one or more client devices 306a-b.

The network 302 generally refers to any interconnecting system capable of transmitting audio, video, signals, data, messages, or any combination of the preceding. Further, the network 302 may include all, or a portion of a public switched telephone network (PSTN), a public or private network, a local area network (LAN), a metropolitan area network (MAN), a wide area network (WAN), a local, regional, or global communication or computer network such as the Internet, a wired or wireless network, other suitable communication link, or any combination of similar systems.

Computing devices 306a-b may communicate with server 304 via network 302, which may include any number of subnetworks. Network 302 may transmit information in packet flows in one embodiment. A packet flow includes one or more packets sent from a source to a destination. A packet may comprise a bundle of data organized in a specific way for transmission, and a frame may comprise the payload of one or more packets organized in a specific way for transmission. A packet-based communication protocol, such as Internet Protocol (IP), may be used to communicate the packet flows.

A packet flow may be identified in any suitable manner. As an example, a packet flow may be identified by a packet identifier giving the source and destination of the packet flow. A source may be given by an address, such as the IP address, port, or both. Similarly, a destination may be given by an address, such as the IP address, port, or both.

According to certain embodiments, network 302 may utilize protocols and technologies to transmit information. Example protocols and technologies include those described by the Institute of Electrical and Electronics Engineers, Inc. (IEEE) 802.xx standards, such as 802.11, 802.16, or WiMAX standards, the International Telecommunications Union (ITU-T) standards, the European Telecommunications Institute (ETSI) standards, Internet Engineering Task Force (IETF) standards, the third-generation partnership project (3GPP) standards, or other standards.

According to certain embodiments, authentication server 304 may include a file server, a domain name server, a proxy server, a web server, a computer workstation, or any other device suitable for authenticating a transaction. Further, the authentication server 304 may use any appropriate operating system, such as MS-DOS®, MAC-OS®, WINDOWS®, UNIX®, or any other operating system currently in existence or developed in the future.

According to certain embodiments, authentication server 304 maintains user and/or account information in memory 330. The account information may be used in the authentication of users and the completion of transactions by such users. According to certain embodiments, memory 330 may include storage media, such as hard disk drives, volatile or non-volatile memory, optical disk storage devices, or any other storage devices, including removable storage devices.

As used here, the terms "computing device," "wireless device," and "mobile device" generally refer to any suitable device operable to communicate with the authentication server 304 through the network 302. Computing devices 306a-b may include, for example, a personal digital assistant, a computer (e.g., a laptop, a desktop workstation, a server, etc.), a cellular phone, a mobile internet device (MID), an ultra-mobile PC (UMPC), or any other device operable to communicate with the authentication server 304 through the network 302. Further, computing devices 306a-b may employ any known operating systems such as MS-DOS®, PC-DOS®, OS-2®, MAC-OS®, or any other appropriate operating systems.

In particular embodiments of the invention, communications computing devices 306a-b and authentication server 304 may be effected according to one or more secure wireless communication protocols or WLAN protocols, such as portions or all of the Wired Equivalent Privacy (WEP) protocol, the Robust Security Network (RSN) associated with the IEEE 802.11 protocol, the IEEE 802.1x protocol, the Advanced Encryption Standard (AED), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shred key (WPA2-PSK) protocol, for example.

Figure 4:
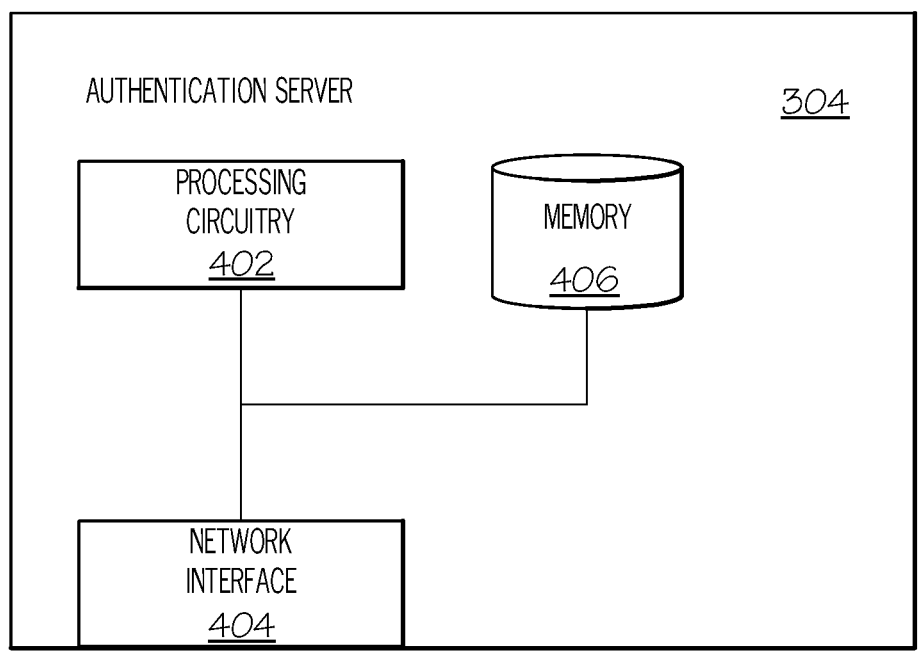
FIG. 4 illustrates an authentication server for authenticating a user based on a dynamically-generated authentication grid, according to a non-limiting embodiment of the present disclosure.

FIG. 4 illustrates an authentication server 304 for the dynamic generation of an authentication grid for use in grid-based authentication, according to a non-limiting embodiment. As depicted, authentication server 304 includes a processing circuitry 402, a network interface 404, and a system memory 406. The network interface 404 connects authentication server 304 to network 302. The processing circuitry 402 may be utilized for the processing requirements of authentication server 304. In certain embodiments, processing circuitry 402 may be operable to load instructions from a hard disk into memory 406 and execute those instructions.

Network interface 404 may refer to any suitable device capable of receiving an input, sending an output from authentication server 304, performing suitable processing of the input or output or both, communicating with other devices, and so on. For example, the network interface 404 may include appropriate modem hardware, network interface card, and similar devices. Further, the software capabilities of the network interface 404 may include protocol conversion and data processing capabilities, to communicate through a LAN, WAN, or other communication system, allowing authentication server 304 to communicate to other devices. Moreover, the network interface 404 may include one or more ports, conversion software, or both.

Processing circuitry 402 can be any suitable device capable of executing instructions to perform operations for authentication server 304. Processing circuitry 402 may include microprocessors, microcomputers, microcontrollers, digital signal processors, central processing units, processing circuitry, state machines, logic circuitries, and/or any devices that manipulate signals based on operational instructions. For example, processing circuitry 402 may be any central processing unit (CPU), such as the Pentium processor, the Intel Centrino processor, and so on.

According to certain embodiments, for example, processing circuitry 402 may operate to enroll, register, or otherwise provision a user and/or a user's computing device to participate in dynamically-generated grid-based authentication. During the provisioning process, processing circuitry 402 may operate to share a secret with the user's computing device 306a-b. Later, when the user conducts a transaction, processing circuitry 402 may operate to generate the dynamic authentication grid, cryptographically camouflage the dynamically-generated authentication grid using the shared secret, convert the encrypted dynamically-generated authentication grid into a machine-readable code, and then transmit the machine-readable code to the user's computing device 306a-b. Additionally, processing circuitry 402 may operate to generate a unique challenge based on the dynamically-generated authentication grid and transmit it to the user's computing device for authentication of the transaction.

System memory 406 may be any suitable device capable of storing computer-readable data and instructions. For example, the system memory 406 may include logic in the form of software applications, random access memory (RAM) or read only memory (ROM). Further examples may include mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination of any of the preceding.

According to certain embodiments, memory 406 stores authentication information, which may include data generated or received during a registration or provisioning process by a user. As will be described in more detail below, the authentication information may include the shared secret. Additionally, for the purpose of associating the authentication information with a user, memory 406 may also store account information, which may include any data generated or received for the completion of transactions by computing devices 306a-b. Where the authorization server 304 is associated with a financial institution, account information may include credit or debit card information including account number, expiration dates, security codes, authentication information, user-selected settings, and other suitable information. Additionally, memory 406 may be also used to store transaction related information associated with an account, in a particular embodiment. Such information may also include merchant identification information, location information, date information, amount information, requesting user information, or other suitable transaction-specific information, according to certain embodiments.

Although authentication server 304 is depicted as including only a single network interface 404, processing circuitry 402, and memory 406, these items may be present in multiple items, or combined items, as known in the art. It is also recognized that other embodiments may include the placement of one or more of these components elsewhere in authentication server 304.

According to certain embodiments, authentication server 304 or another service provider may provide the smart application that is downloadable to computing devices 306a-b. In a particular embodiment, for example, the smart application include logic for scanning and reading the machine-readable code received from the authentication server. According to certain embodiments, the smart application may include logic for using the shared secret that is also maintained by authentication server 304 to convert the encrypted grid into an authentication grid that a user can read.

Figure 5:
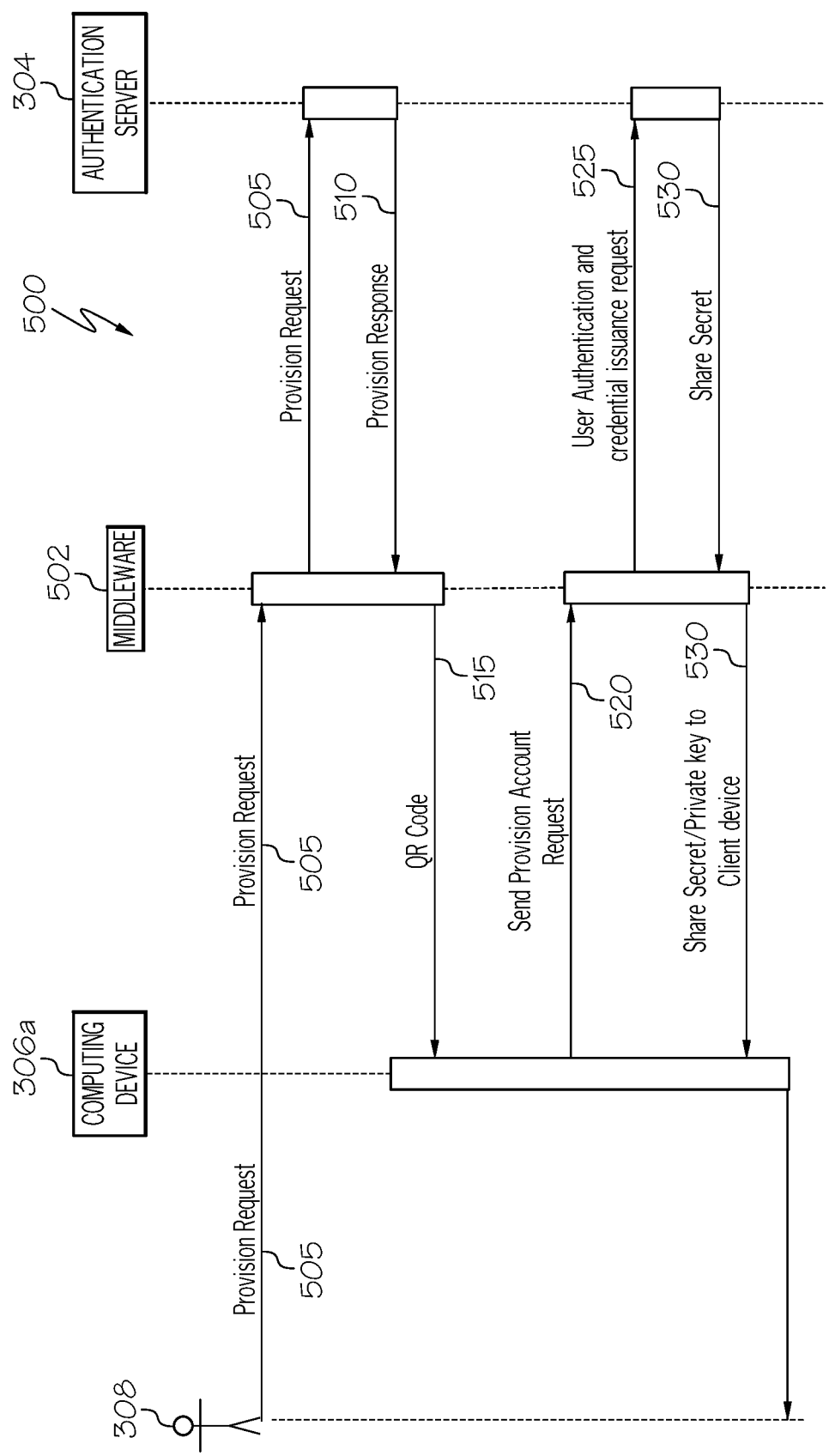
FIG. 5 illustrates an example message sequence for provisioning a computing device of a user to receive dynamically-generated authentication grids for OTP authentication, according to a non-limiting embodiment of the present disclosure.

FIG. 5 illustrates an example message sequence 500 for provisioning the computing device 306a of user 308 to receive dynamically-generated authentication grids for OTP authentication, according to a non-limiting embodiment of the present disclosure. The sequence begins when user 308 transmits a provision request 505 via computing device 306a or otherwise. As depicted, provision request 505 is received by middleware 502 before being forwarded to server 304. According to certain embodiments, the middleware 502 may include logic or hardware or a combination thereof that operates as a broker between computing device 306a and server 304. In a particular embodiment, the middleware 502 may be a smart application that is able to receive, scan, and read machine-readable codes. For example, middleware 502 may also be able to receive, scan, and read a QR Code®, in a particular embodiment.

Server 304 receives provision request 505 and transmits a provision response 510 in response. In a particular embodiment, the provision response 510 may include a QR Code®. Middleware 502 scans and reads the QR Code® and delivers the scanned QR content 515 to computing device 306a.

As depicted, computing device 306a then transmits a provision account request 520 to set up computing device 306a to receive encrypted authentication grids. Middleware 502 transmits the provision account request as a user authentication and credential issuance request. Server 304 receives the user authentication and credential issuance request and generates a shared secret. The shared secret 530 is transmitted to middleware 502 and is stored on user computing device 306a. In a particular embodiment, the shared secret may include a private key that is stored using cryptographic camouflaging technology such as that described in U.S. Pat. No. 6,170,058, which is hereby incorporated by reference in its entirety. According to certain embodiments, computing device 306a may now be ready to receive dynamically-generated and encrypted authentication grids used during OTP authentication.

Figure 6:
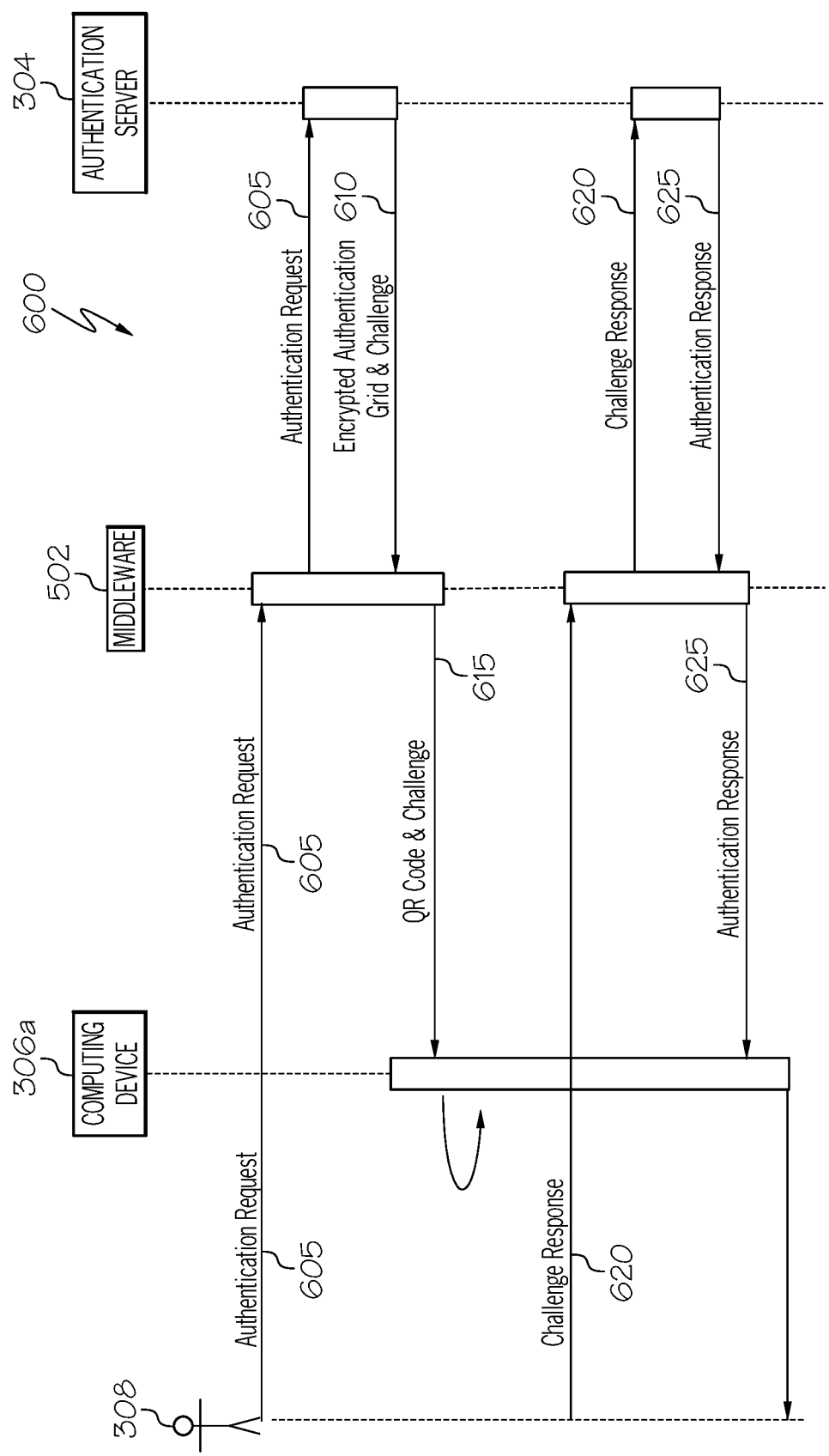
FIG. 6 illustrates an example message sequence for authenticating a user based on a dynamically-generated authentication grid, according to a non-limiting embodiment of the present disclosure.

FIG. 6 illustrates an example message sequence 600 for authenticating a user based on a dynamically-generated authentication grid, according to a non-limiting embodiment of the present disclosure. The method begins when an authentication request 605 is transmitted from user 308 and/or computing device 306a. Server 305 receives the authentication request 605 and generates a dynamic authentication grid and a challenge based on the dynamic authentication grid. Prior to transmission to middleware 502, server 305 encrypts the dynamically generated authentication grid using the shared secret associated with the user 308 and the user's account. Middleware 502 converts the dynamically-generated and encrypted authentication grid into a machine-readable code such as a QR Code®, in a particular embodiment. The QR Code® and the challenge 610 are then transmitted to user computing device 306a. In a particular embodiment, user computing device 306a scans the QR Code® and uses the shared secret to decrypt the dynamically-generated and encrypted authentication grid. Computing device 306*a* then displays a user-readable version of the authentication grid and the challenge on a display screen of computing device 306*a*.

Based on the displayed authentication grid and the challenge, the user 308 enters a challenge response, which may include user-entered alphabet values in a particular embodiment. Challenge response 620 is forwarded to server 304, which then validates the challenge response and authenticates the user based on the dynamically generated authentication grid generated above. An authentication response 625 is then transmitted to computing device 306*a*.

Figure 7:
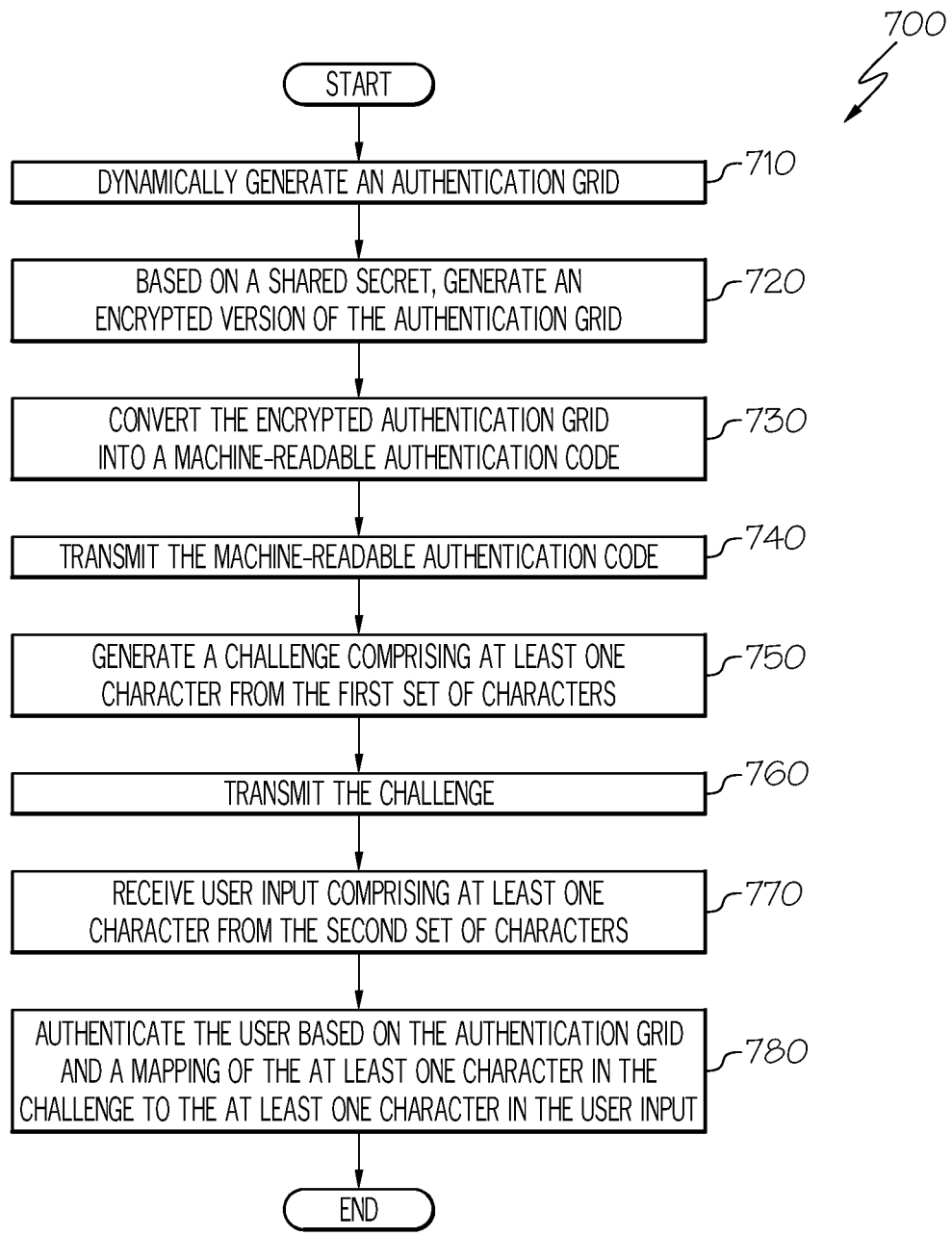
FIG. 7 illustrates an example process by an authentication server for authenticating a user based on a dynamically-generated authentication grid, according to a non-limiting embodiment of the present disclosure.

FIG. 7 is a flow diagram depicting an example process 700 for authenticating user 308 based on a dynamically-generated authentication grid, according to a non-limiting embodiment of the present disclosure. The process 700 may be considered side-by-side with FIGS. 8A-D, which illustrate example GUIs that may be displayed to user 308 one or more computing devices 306*a-b* associated with user 308 during the authentication process. A more detailed description of the authentication process from the perspective of computing device 306*a-b* of the user is described below with respect to FIG. 9.

The process 700 begins at step 710 when an authentication grid is dynamically generated. According to certain embodiments, the authentication grid may be dynamically generated by authentication server 304 and may identify an association between a first set of characters and a second set of characters. In a particular embodiment, each of the first set of characters may include a letter from the alphabet and each of the second set of characters may include a numeral. In another embodiment, each of the first set of characters may include a numeral and each of the second set of characters may include a letter from the alphabet. In still other embodiments, the first set of characters and the second set of characters may both include letters or both include numerals. Alternatively, one or more both the first and second sets of characters may include special characters.

Figure 8A:
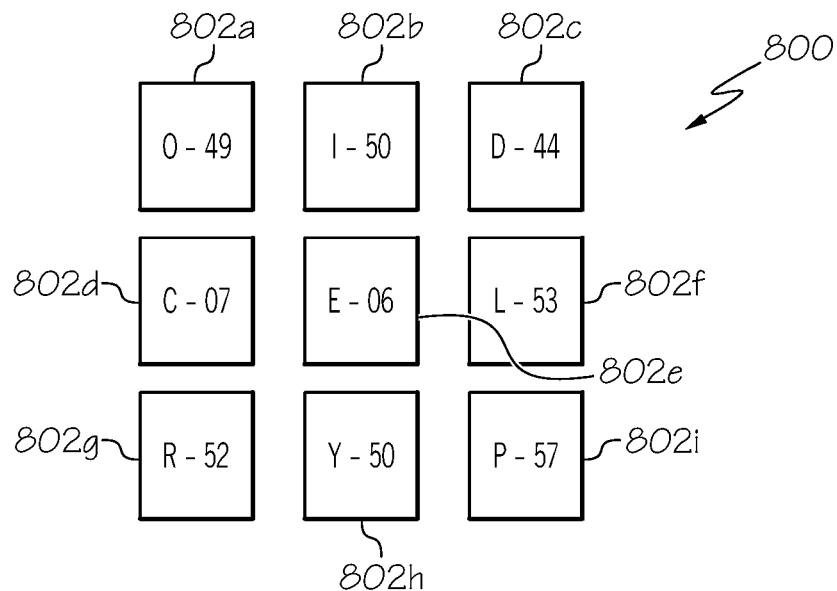
FIGS. 8A, 8B, 8C, and 8D illustrate example graphical user interfaces (GUIs) that may be displayed to a user during the authentication process, according to a non-limiting embodiment of the present disclosure.

According to a particular embodiment, the authentication grid may include a plurality of cells. Each cell may contain a character selected from the first set of characters and a second character selected from the second set of characters. An association is recognized between the characters inside a particular cell. For example, FIG. 8A illustrates an authentication grid 800 that includes nine cells 802*a-i*. Each of the nine cells 802*a-i* contain a randomly selected alphabet character and a randomly selected numeral. Accordingly, the first set of characters includes the following randomly selected set of characters: O, I, D, C, E, L, R, Y, and P. Similarly, the second set of characters includes the following randomly selected set of numerals: 49, 50, 44, 07, 06, 53, 52, 50, and 57. It may be further understood that authentication grid 800 identifies an association between 'O' and '49,' based on their placement in the same cell 802*a*. Authentication grid 800 identifies similar associations between letters and numerals for each cell 802*a-i*.

In a particular embodiment, authentication grid 800 may be generated in response to receiving an authentication request associated with user 308. In one embodiment, for example, authentication server 304 may generate the authentication grid after an authentication request is received from a computing device 306*a* associated with user 308. For example, the authentication request may be received in response to user 308 logging into the user's bank account using a mobile or web-based application on computing device 306*a-b*. As another example, authentication request may be received in response to user 308 using the user's debit card while conducting an online transaction using computing device 306*a-b*. In still another embodiment, the authentication request may be received from a computing device associated with a merchant when the user attempts to use the user's debit card while making a POS at a brick and mortar store.

Returning to FIG. 7, an encrypted version of the authentication grid 800 is generated at step 720. According to certain embodiments, for example, authentication server 304 may use a shared secret to generate the encrypted version of the authentication grid 800. In a particular embodiment, the shared secret may be generated and shared between computing device 306*a-b* of user 308 and authentication server 304 during a provisioning process that was performed prior to process 700. In a particular embodiment, for example, the provisioning process from the authentication server's perspective may include receiving a provisioning request from a computing device associated with user 308, generating the shared secret to be associated with user 308, transmitting the shared secret to the computing device associated with user 308, and storing an association between the shared secret and user 308 and/or a financial account associated with user 308. An example provisioning process was described above in more detail with regard to FIG. 5.

At step 730, the encrypted version of the authentication grid is converted into a machine-readable authentication code. In a particular embodiment, for example, authentication server 304 may convert the authentication grid into the machine-readable code. In another embodiment, middleware 502 may receive the encrypted authentication grid from authentication server 304 and operate to covert the encrypted authentication grid into the machine-readable authentication code.

In a particular embodiment, for example, the machine-readable authentication code may include a QR Code®, which is a type of matrix barcode (or two-dimensional barcode). The QR Code® is a machine-readable optical label that contains information that is encoded using four standardized encoding modes (numeric, alphanumeric, byte/binary, and kanji) to efficiently store data. Typically, a QR Code® consists of black squares arranged in a square grid on a white background, which can be read by an imaging device such as a camera and processed using Reed-Solomon error correction until the image can be appropriately interpreted. The required data can then be extracted from patterns that are present in both horizontal and vertical components of the image.

At step 740, the machine-readable authentication code is transmitted to a first computing device 306*a-b* associated with user 308. In a particular embodiment, for example, the machine-readable authentication code may be transmitted as a SMS message to the user's mobile phone or other computing device. In another embodiment, the machine-readable authentication code may be transmitted in an email address to the user's email account and may be opened on any computing device that is authenticated to receive the user's email. In still another embodiment, the machine-readable authentication code may be transmitted to the smart application stored on the user's mobile device.

At step 750 a challenge is generated. In a particular embodiment, for example, the challenge may be generated by authentication server 304. The challenge includes at least one character randomly selected from the first set of characters of the authentication grid. In a particular embodiment, the challenge may include a string of multiple characters randomly selected from the first set of characters of the authentication grid. The string of characters may be in a first order. Authentication server 304 transmits the challenge to a second computing device 306*a-b* associated with user 308 at step 760

Figure 8B:
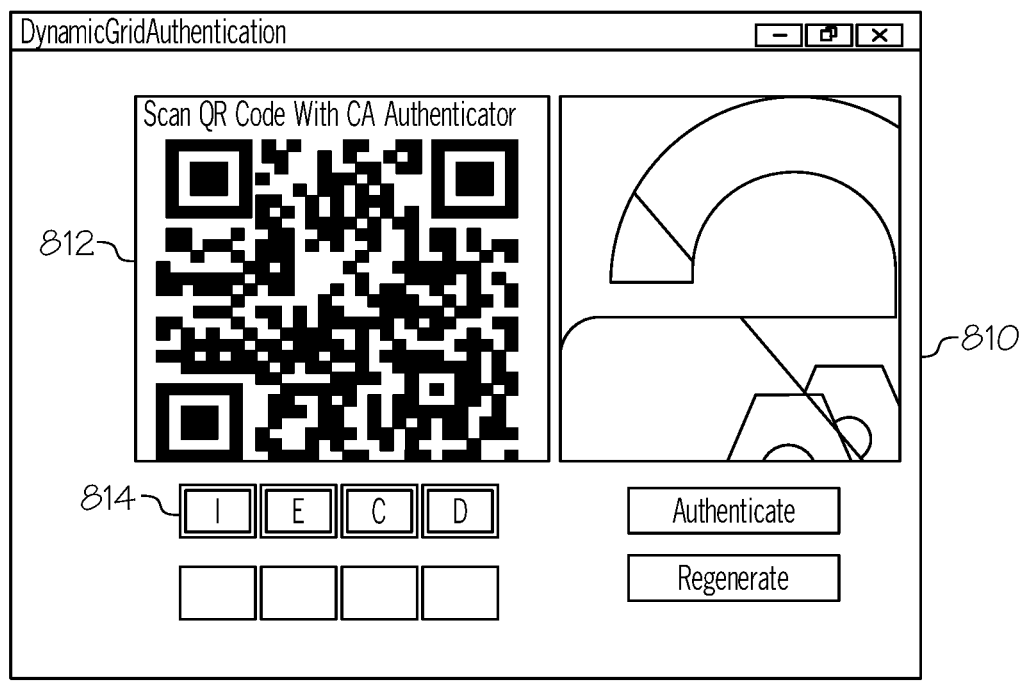

In a particular embodiment, the second computing device that receives the challenge may be different from the first computing device that receives the machine-readable code. In another embodiment, the second computing device may be the same as first computing device, and the challenge and the machine-readable code may be transmitted together or individually. In still another embodiment, the second computing device may be the same as first computing device, and the challenge may be included in the machine-readable code with the encrypted authentication grid.

Where authentication server 304 transmits the machine-readable code and the challenge together, authentication server 304 may cause the machine-readable code and the challenge to be displayed together by computing device 306*a-b*. For example, FIG. 8B illustrates an example GUI 810 that includes both a machine-readable code 812 and a challenge 814. As depicted, challenge 814 includes the following four characters selected from the first set of characters included in authentication grid 800: I, E, C, and D. However, the depicted challenge is provided merely as an example. The challenge may have more or fewer characters than those depicted. Additionally, as discussed herein, it is recognized that the specific number of characters may be based on a desired level of security as selected based on a security setting or a user setting.

Returning to FIG. 7, authentication server 304 receives user input from computing device 306*a-b* at step 770. According to certain embodiments, the user input includes at least one second character within the second set of characters of the authentication grid. More specifically, the user input includes at least one character selected by user 308 based on the machine-readable authentication code and the challenge transmitted in step 750.

In a particular embodiment, the user input includes a plurality of characters within the second set of characters. For example, continuing the example depicted in FIG. 8B, if the challenge transmitted at step 750 includes the characters 'I', 'E', 'C', and 'D' based on authentication grid 800, the user input may include numerals '50,' '06', '07', and '44', in a particular embodiment.

At step 780, authentication server 304 authenticates user 308 based at least in part on the dynamically generated authentication grid from step 720 and a mapping of the at least one character in the first set of characters in the challenge generated at step 750 to the at least one second character as received in the user input at step 770.

According to certain embodiments, for example, authentication server 304 may use the authentication grid and the association between the first sets of characters and the second characters to identify a particular character within the second set of characters that is associated with a character from the first set of characters as included in the challenge. For example, if the challenge transmitted at step 750 is challenge 814 illustrated in FIG. 8B and the authentication grid that is generated at step 710 is authentication grid 800 illustrated in FIG. 8A, authentication server 304 may use authentication grid 810 to determine that numerals '50,' '06', '07', and '44' are associated with letters 'I', 'E', 'C', and 'D'. In this particular scenario, authentication server 304 would then determine that the valid OTP for this particular transaction is '50,' '06', '07', and '44'. The ordering of numerals '50,' '06', '07', and '44', as presented here, may be considered a second order.

According to certain embodiments, authentication server 304 may compare the valid OTP to the user input received at step 770 and determine whether to authenticate user 308 based on the comparison. For example, if the characters and the order of the characters included in the user input matches the characters and the order of the characters in the valid OTP, the user may be authenticated. Conversely, if the characters in the user input does not match the characters in the valid OTP, authentication may fail. Likewise, if the order of the characters in the user input does not match the order of the characters in the valid OTP, authentication may fail. Further, because each authentication grid 800 is associated with a time of life, authentication may fail if user 308 fails to enter the correct OTP before the expiration of authentication grid 800. In a particular embodiment, when authentication fails, a new authentication grid 800 may be generated with new randomly selected characters from the first and second character sets. The process may then repeat until user 308 is successfully authenticated.

Figure 8C:
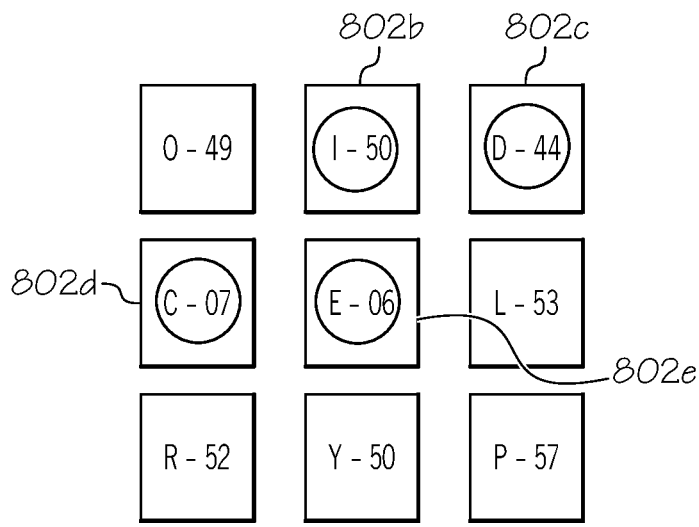
Figure 8D:
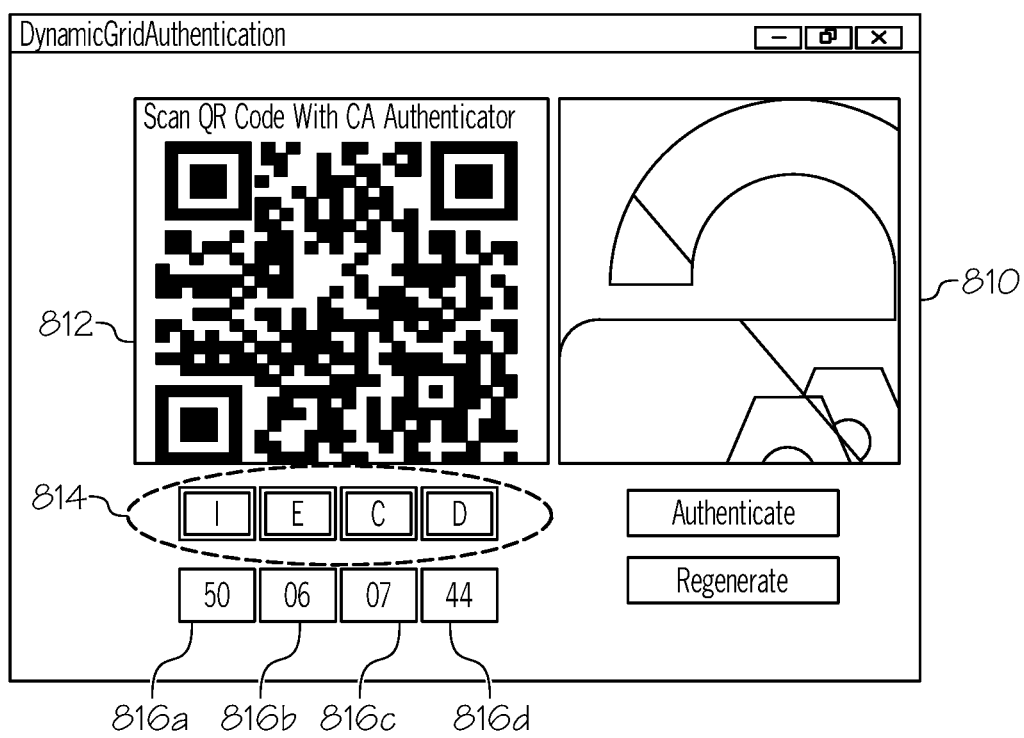
Figure 9:
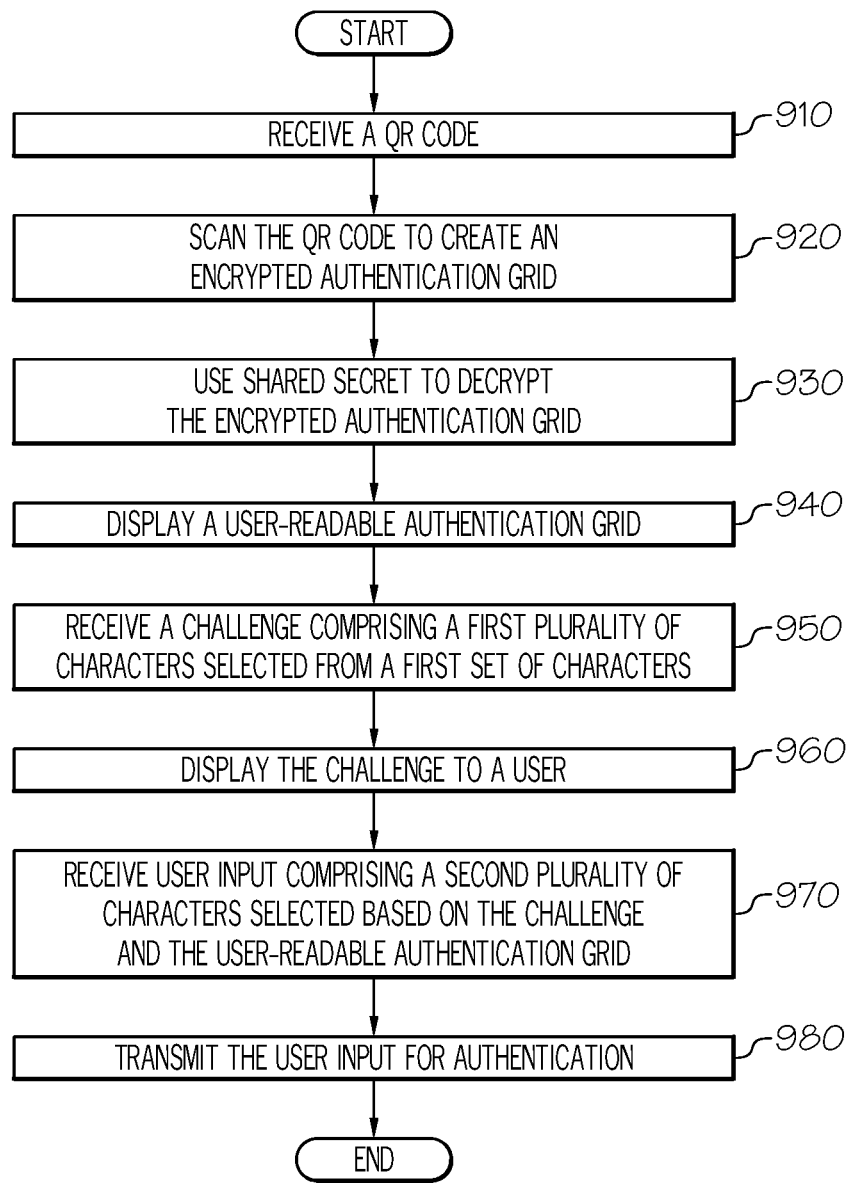
FIG. 9 illustrates an example process by a computing device used during the authentication of user based on a dynamically-generated authentication grid, according to a non-limiting embodiment of the present disclosure.

FIG. 9 is a flow diagram depicting an example process 900 by a computing device 306*a-b* used during the authentication of user 308 based on a dynamically-generated authentication grid, according to a non-limiting embodiment of the present disclosure. The process 900 may be considered side-by-side with FIGS. 8A-D, which illustrate example GUIs that may be displayed to user 308 one or more computing devices 306*a-b* during the authentication process.

The method may begin at step 910 when computing device 306*a-b* receives an encrypted machine-readable authentication code from authentication server 304 and/or middleware 502. In a particular embodiment, for example, the encrypted machine-readable authentication code may include a QR Code®, which may be displayed to user 308 in GUI such as GUI 810 shown in FIG. 8B.

In a particular embodiment, the encrypted machine-readable authentication code may be received in response to a request for authentication of user 308 that was previously transmitted to authentication server 304 (not depicted). In a particular embodiment, for example, the encrypted machine-readable authentication code may be received when user 308 attempts to log into the user's bank account using a mobile or web-based application on computing device 306*a-b*. In another embodiment, the encrypted machine-readable authentication code may be received when user 308 uses the user's debit card to conduct an online transaction using computing device 306*a-b*. In still another embodiment, the encrypted machine-readable authentication code may be received when user 308 attempts to use the user's debit card while making a POS at a brick and mortar store.

In a particular embodiment, the encrypted machine-readable authentication code may be received by computing device 306*a-b* as a SMS message. In another embodiment, the encrypted machine-readable authentication code may be received in an email that is opened by user 308 on computing device 306*a-b*. In still another embodiment, the encrypted machine-readable authentication code may be received by a smart application stored on computing device 306*a-b*.

At step 920, computing device 306*a-b* may be used to scan the machine-readable code to convert the encrypted machine-readable authentication code into an encrypted authentication grid. Computing device 306*a-b* then uses a shared secret to decrypt the encrypted authentication grid to generate a user-readable authentication grid that identifies an association between a first set of characters and a second set of characters at step 930. According to certain embodiments, the shared secret may be received from authentication server 304 and stored during a provisioning process that was performed prior to process 900. An example provisioning process was described above in more detail with regard to FIG. 5.

At step 930, computing device 306*a-b* presents the authentication grid on a display for user 308. For example, in one particular embodiment, authentication grid may include an authentication grid such as authentication grid 800 which is illustrated in FIG. 8A. Thus, continuing the example scenario began above, authentication grid 800 identifies an association between the letters O, I, D, C, E, L, R, Y, and P and 49, 50, 44, 07, 06, 53, 52, 50, and 57, respectively.

At step 940, computing device 306*a-b* receives a challenge from authentication server 304. According to certain embodiments, the challenge includes a first plurality of characters selected from the first set of characters, which may be displayed to user 308 at step 950. As an example, FIG. 8B illustrates an example GUI 810 that includes challenge 814. As depicted, challenge 814 includes the following four characters selected from the first set of characters included in authentication grid 800: I, E, C, and D.

At step 960, computing device 306*a-b* receives user input from user 308. According to certain embodiments, the user input includes a second plurality of characters that user 308 selects based on authentication grid 800 and the challenge and the user-readable authentication grid. For example, consider again the example scenario depicted in FIGS. 8A-8B. User 308 may first refer to challenge 814 to determine the specific characters included in challenge 814. In this example the challenge characters include: I, E, C, and D. User 308 may then refer to authentication grid 800 to identify the particular cells 802 that are associated with the challenge characters of 'I', 'E', 'C', and 'D'. FIG. 8C depicts authentication grid 800 with the identified cells 802*b-e* circled. In this scenario then, user 308 knows to use only the identified cells 802*b-e* to the OTP. User 308 further knows, based on authentication grid 800, that challenge characters of 'I', 'E', 'C', and 'D' are associated with numerals '50', '44', '07', and '06'. Accordingly, user 308 may now determine that the OTP for the authentication grid 800 is '50', '44', '07', and '06', and user 308 may enter the OTP into the input boxes in GUI 810.

FIG. 8D illustrates GUI 810 after user 308 has entered the numerals '50', '44', '07', and '06' into the input boxes 816*a-d* associated with 'I', 'E', 'C', and 'D', respectively. Again, the order in which the numerals are inserted into input boxes 816*a-d* may be important in certain embodiments. Thus, in particular embodiments, the user may not be successfully authenticated if the order of the characters of the user input does not match the order of the characters in the challenge.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method comprising:
   dynamically generating an authentication grid that identifies an association between a first set of characters and a second set of characters;
   based on a shared secret associated with a user, generating an encrypted version of the authentication grid;
   converting the encrypted version of the authentication grid into machine-readable authentication code;
   transmitting the machine-readable authentication code to a first computing device associated with the user;
   generating a challenge comprising at least one character in the first set of characters identified in the authentication grid;
   transmitting the challenge to a second computing device associated with the user;
   receiving user input from the second computing device, the user input comprising at least one second character in the second set of characters, the at least one second character based on the machine-readable authentication code; and
   authenticating the user based at least in part on the authentication grid and a mapping of the at least one character in the first set of characters in the challenge to the at least one second character as received in the user input based on the machine-readable authentication code.

2. The method of claim 1, wherein the first computing device is different than the second computing device.

3. The method of claim 1, wherein the authentication grid has a plurality of cells, each of the plurality of cells being associated with:
a first character within the first set of characters; and
a second character within the second set of characters.

4. The method of claim 1, wherein:
the challenge comprises a first plurality of characters from the first set of characters identified in the authentication grid, the first plurality of characters in a first order;
the user input comprises a second plurality of characters from the second set of characters, the second plurality of characters in a second order; and
authenticating the user is based on using the authentication grid to map each one of the first plurality of characters in the first order to a respective one of the second plurality of characters in the second order.

5. The method of claim 1, wherein:
each of the first set or characters comprises a character from the alphabet and each of the second set of characters comprises a numeral; or
each of the first set of characters comprises a numeral and each of the second set of characters comprises a character from the alphabet.

6. The method of claim 1, wherein dynamically generating the authentication grid comprises:
receiving a request for authentication, the request for authentication being associated with a user; and
dynamically generating the authentication grid in response to receiving the request.

7. The method of claim 1, further comprising:
prior to transmitting the encrypted version of the authentication grid to the first computing device, converting the encrypted version of the authentication grid into a machine-readable authentication code, and
wherein transmitting the encrypted version of the authentication grid to the first computing device comprises transmitting the machine-readable authentication code to the first computing device.

8. The method of claim 7, wherein the machine-readable authentication code comprises a QR Code®.

9. The method of claim 1, wherein transmitting the machine-readable authentication code to the first computing device associated with the user comprises sending a SMS message comprising the machine-readable authentication code to a mobile device associated with the user.

10. The method of claim 1, further comprising:
prior to dynamically generating the authentication grid:
receiving a provision request;
generating the shared secret associated with the user;
transmitting, to the first or the second computing device of the user, the shared secret; and
storing, by the authentication server, an association between the shared secret and a financial account associated with the user.

11. A non-transitory, computer-readable storage medium having instructions stored thereon, the instructions being executable by a computing system to cause the computing system to:
dynamically generate an authentication grid that identifies an association between a first set of characters and a second set of characters;
based on a shared secret associated with a user, generate an encrypted version of the authentication grid;
convert the encrypted version of the authentication grid into machine-readable authentication code;
transmit the machine-readable authentication code to a first computing device associated with the user;
generate a challenge comprising at least one character from the first set of characters identified in the authentication grid;
transmit the challenge to a second computing device associated with the user;
receive user input from the second computing device, the user input comprising at least one second character from the second set of characters, the at least one second character based on the machine-readable authentication code; and
authenticate the user based at least in part on the authentication grid and a mapping of the at least one character in the first set of characters in the challenge to the at least one second character as received in the user input based on the machine-readable authentication code.

12. The non-transitory, computer-readable storage medium of claim 11, wherein the first computing device is different than the second computing device.

13. The non-transitory, computer-readable storage medium of claim 11, wherein the authentication grid has a plurality of cells, each of the plurality of cells being associated with:
a first character within the first set of characters; and
a second character within the second set of characters.

14. The non-transitory, computer-readable storage medium of claim 13, wherein:
the challenge comprises a first plurality of characters from the first set of characters identified in the authentication grid, the first plurality of characters being placed in a first order;
the user input comprises a second plurality of characters from the second set of characters, the second plurality of characters being placed in a second order; and
authenticating the user is based on using the authentication grid to map each one of the first plurality of characters in the first order to a respective one of the second plurality of characters in the second order.

15. The non-transitory, computer-readable storage medium of claim 11, wherein:
each of the first set or characters comprises a character from the alphabet and each of the second set of characters comprises a numeral; or
each of the first set of characters comprises a numeral and each of the second set of characters comprises a character from the alphabet.

16. The non-transitory, computer-readable storage medium of claim 11, wherein the authentication grid is dynamically generated in response to receiving a request for authentication, the request for authentication being associated with a user.

17. The non-transitory, computer-readable storage medium of claim 11, wherein the instructions are further executable by the computing system to cause the computing system to:
prior to transmitting the encrypted version of the authentication grid to the first computing device, convert the encrypted version of the authentication grid into a machine-readable authentication code, and
wherein the machine-readable authentication code comprises a QR Code®, and
wherein transmitting the encrypted version of the authentication grid to the first computing device comprises transmitting the QR Code® to the first computing device.

18. The non-transitory, computer-readable storage medium of claim 11, wherein transmitting the machine-readable authentication code to the first computing device associated with the user comprises sending a SMS message comprising the machine-readable authentication code to a mobile device associated with the user.

19. The non-transitory, computer-readable storage medium of claim 11, wherein the instructions are further executable by the computing system to cause the computing system to:
prior to dynamically generating the authentication information set:
receive a provision request;
generate the shared secret associated with the user;
transmit, to the first or the second computing device of the user, the shared secret; and
store, by the authentication server, an association between the shared secret and a financial account associated with the user.

20. A non-transitory, computer-readable storage medium having instructions stored thereon, the instructions being executable by a computing system to cause the computing system to:
receive an encrypted authentication grid;
use a shared secret to decrypt the encrypted authentication grid to generate a user-readable authentication grid that identifies an association between a first set of characters and a second set of characters;
display the user-readable authentication grid;
receive, from an authentication server, a challenge comprising a first plurality of characters selected from the first set of characters;
display the challenge on a display of a client device;
receive user input comprising a second plurality of characters based on the challenge and the user-readable authentication grid; and
transmit, to the authentication server, the user input comprising the second plurality of characters for authentication of a user.

21. The non-transitory, computer-readable storage medium of claim 20, wherein:
the encrypted authentication grid is received as a machine-readable authentication code comprising a QR Code®, and
the instructions are further operable to be executable by the computing system to cause the computing system to scan the machine-readable authentication code comprising the QR Code® to identify the encrypted authentication grid prior to decrypting the encrypted authentication grid to generate the user-readable authentication grid.

* * * * *